US008245507B2

(12) United States Patent
Heusser et al.

(10) Patent No.: US 8,245,507 B2
(45) Date of Patent: Aug. 21, 2012

(54) HYDRAULIC CONTROL DEVICE

(75) Inventors: Martin Heusser, Munich (DE); Hilarius Hundschell, Isen (DE); Sascha Rumenap, Munich (DE)

(73) Assignee: HAWE Hydraulik SE, Munich (DE)

( * ) Notice: Subject to any disclaimer, the term of this patent is extended or adjusted under 35 U.S.C. 154(b) by 825 days.

(21) Appl. No.: 12/407,496

(22) Filed: Mar. 19, 2009

(65) Prior Publication Data

US 2009/0235921 A1 Sep. 24, 2009

(30) Foreign Application Priority Data

Mar. 20, 2008 (EP) .................................... 08005381

(51) Int. Cl.
*F16D 31/02* (2006.01)

(52) U.S. Cl. ................ 60/387; 60/417; 91/5; 91/DIG. 1

(58) Field of Classification Search .................... 60/387, 60/417; 91/5, DIG. 1
See application file for complete search history.

(56) References Cited

U.S. PATENT DOCUMENTS 1,888,310 A * 11/1932 Davis ................................ 91/5
6,269,641 B1 * 8/2001 Dean .................................. 91/1
7,325,398 B2 2/2008 Cherney
2005/0196288 A1 9/2005 Cherney

FOREIGN PATENT DOCUMENTS

DE 10 2005 009843 A1 9/2005
FR 2 700 811 7/1994

* cited by examiner

*Primary Examiner* — Daniel Lopez
(74) *Attorney, Agent, or Firm* — Cook Alex Ltd.

(57) ABSTRACT

A hydraulic control device for moving at least one hydraulic consumer comprises at least one supply line, a discharge line or bypass line to which the hydraulic consumer is connected, and at least one pressure source and, optionally, a directional control valve. The line contains a dosing device for measuring a hydraulic medium dose by using a given compressibility of the hydraulic medium. The measured hydraulic medium dose either is supplied from the dosing device into the hydraulic consumer connected downstream or is discharged from the hydraulic consumer connected upstream into the dosing device. The dosing device comprises from upstream to downstream in series first and second blocking members which respectively can be switched into a leakage-free blocking position and into a through flow position, and a dead space between the blocking members. For dosing the hydraulic medium dose the blocking members are switched several times alternatingly.

7 Claims, 6 Drawing Sheets

HYDRAULIC CONTROL DEVICE

BACKGROUND OF THE INVENTION

This application claims the benefit under 35 USC 119 of European Patent Application No. 08005381.2, filed Mar. 20, 2008, the disclosure of which is incorporated herein by reference.

Sometimes it is necessary in the field of high pressure hydraulic to control a hydraulic consumer to carry out extremely small movements only. In many cases, this hydraulic consumer is also controlled in a conventional fashion to carry out large movements, and if necessary, even independent of the current load. The mentioned small movements of the hydraulic consumer can be realised only with dedicated structures because of the conventional high working pressures of about 100 to 800 bar, e.g. by means of relatively large dimensioned solenoid valves or throttling valves which then are controlled to open for a very short time and/or very little. This short time or small opening degree needs powerful solenoids and a complicated control device. Moreover, a lot of solenoid actuating primary energy is wasted, and the hydraulic medium is mechanically highly loaded. Small movements of a hydraulic consumer, e.g. only some millimetres, until now, cannot be realised satisfactorily with conventional technologies.

The requirement for extremely small movement steps of a hydraulic consumer occur e.g. in tooling machine feed systems, and in the recent past particularly for solar panels which stepwise have to track the position of the sun as precisely as possible, and at best always after some minutes. As large numbers of solar panels in most cases in solar power plants are controlled by discrete control devices, the above-mentioned complicated structures and the sophisticated control technology result in a cost factor which cannot be tolerated. In addition, such control devices for solar panels contain an electrohydraulic control section which, of course, only should consume a fraction of the electric energy which is gained by the solar panel itself. This calls for extremely weak solenoids operating with a minimum consumption of electric power. However, extremely weak solenoids normally are not apt to control extremely small movements of the hydraulic consumers.

Besides control devices for adjusting solar panels according to the position of the sun and for tooling machine feeding systems there are many further applications where hydraulic consumers sometimes have to be moved in small steps.

An electrohydraulic control device for a working vehicle known from DE-A-10 2005 009 843 comprises a closed hydraulic working circuit for the hydraulic consumer designed as a differential cylinder. A reversible hydraulic pump is the sole pressure source used to extend or retract a piston rod of the hydraulic consumer. A pressure accumulator is provided in a working line between two control valves. The pressure accumulator has two chambers separated by a diaphragm, both chambers having variable volumes for the hydraulic medium and a biasing medium. The control valves are 2/2-way directional valves and are solenoid actuated counter to spring force. The pressure accumulator serves to preliminarily store hydraulic medium under bias pressure, which hydraulic medium stems from the difference from the volumes between the piston rod side chamber and the piston side chamber of the hydraulic differential cylinder. Hydraulic medium stored in the pressure accumulator then is fed into the pump delivery flow when the pump is operating.

A device in a hydraulic/pneumatic combination compound structure is known from FR-A-2700811, and is used to generate rectangular pressure signals in a testing probe connected to a hydraulic part. A series of cam actuated 2/2-way directional valves, which are arranged in series operate such that a leakage-free blocking position can be adjusted preliminarily for each 2/2-way directional valve.

SUMMARY OF THE INVENTION

It is an object of the invention to provide a hydraulic control device and a method for moving at least one hydraulic consumer allowing to control hydraulic consumers in extremely small movement steps in a structurally simple, fair costs and energy saving fashion.

This object is achieved by the features of claim 1 and of claim 6.

Although hydraulic medias like hydraulic oil or the like are incompressible liquids, practice shows, to the contrary, that such hydraulic medias have an inherent compressibility between about 0.15% to 1.0%, preferably volume percent, in case of high operating pressures. This compressibility is used according to the invention in the electrohydraulic control device, in particular for actuating feed systems of tooling machines or control devices for adjustable solar panels and according to the method in order to control at least one hydraulic consumer to carry out extremely small adjusting steps. In more detail, in the dosing device dead space which is rigid, hermetically sealed, and inflexible, hydraulic medium is compressed. By the compression and the inherent compressibility only an additional hydraulic medium dose is stored in the given volume capacity of the dead space. This additionally stored hydraulic medium dose is used to control a respective small step of the hydraulic consumer. This hydraulic medium dose either is taken from the hydraulic consumer while it is stored, or is fed into the hydraulic consumer after it first has been stored. For the compression of the hydraulic medium a pressure difference is used which is built up across the dosing device, such that with the second blocking member in the blocking position the first blocking member is brought into the through flow position to store the exactly measured hydraulic medium dose in compressed condition in the dead space by higher pressure from the hydraulic consumer upstream, before the first blocking member is switched back into the blocking position. This sequence generates a minimum actuation step for a hydraulic consumer connected upstream. However, if the hydraulic consumer is connected downstream, then a previously stored hydraulic medium dose under higher pressure is fed into the hydraulic consumer having lower pressure in order to move the hydraulic consumer over a minimum actuation step, by opening the second blocking member while the first blocking member again has been switched into the blocking position, such that owing to the lower pressure downstream in the hydraulic consumer the hydraulic medium dose is displaced from the dead space to the hydraulic consumer. The dead space is constituted by a hermetically sealed container, which is inflexible and has a given volume capacity and/or is constituted by an accordingly long piping section between the blocking members or at least is provided partially in one or in both blocking members. In this case it is important that both blocking members are seat valves which block in their blocking positions without any leakage. Time intervals between consecutive adjustment steps can be selected arbitrarily short or arbitrarily long.

In a control device moving a solar panel such that it is tracking the changing position of the sun the dosing device is of particular advantage, because it may have very small sized and simple seat valves actuated by extremely small sized solenoids which have weak power and operate with low electricity consumption. While controlling a small adjustment step of the hydraulic consumer by means of the dosing device a pump generally serving as the pressure source for the control device, e.g. an electrically driven pump, even may be switched off.

Of particular use for the dosing device are seat valves which can be actuated manually, hydraulically or by a solenoid and counter to spring load. Such seat valves may have very small dimensions as they only need to process small amounts of hydraulic medium for the dosing function, and which for this reason are available for fair cost.

In an expedient embodiment the hydraulic consumer is a hydraulic cylinder rotating or tilting a solar panel. The hydraulic cylinder may be actuated hydraulically in one direction counter to a load or may be actuated in both directions. The hydraulic cylinder may be a differential cylinder. A respective dosing device may be provided either in one working line or in both working lines of the hydraulic cylinder. In the case of a differential cylinder the dosing device may be used for dosing hydraulic medium from the chamber at the side of the piston rod to the chamber at the side of the piston, or vice versa.

In order to avoid e.g. cavitation effects it may be expedient to provide a biasing valve downstream of the second blocking member.

In an expedient embodiment which can be operated with a minimum amount of primary energy at least one pressure accumulator is associated to the hydraulic consumer in a working line circuit. The pressure accumulator, preferably, is supplied from the pressure source or even from the hydraulic consumer itself. The dosing device is arranged in at least one working line of the hydraulic consumer. This working line selectively can be connected via a multi-way directional valve with the pressure source or the tank. A pump constituting the pressure source may be switched off while using the dosing device to control a minimum movement step of the hydraulic consumer or several even while initiating a series of consecutive movement steps.

BRIEF DESCRIPTION OF THE DRAWINGS

Embodiments of the invention will be explained with the help of the drawings. The drawings show.

DETAILED DESCRIPTION

Figure 1:
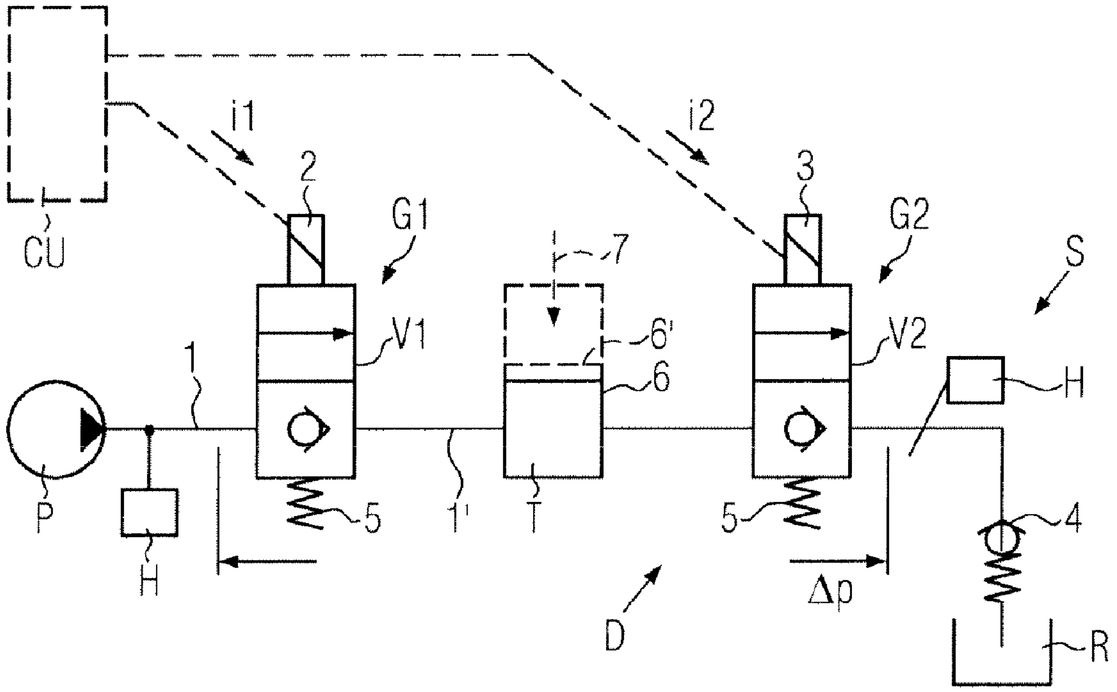
FIG. 1 a schematic block diagram of a dosing device for a hydraulic control device.

A hydraulic control device S schematically shown in FIG. 1 among others is designed such that a hydraulic consumer H can be controlled to carry out minimally small movement steps by means of a hydraulic medium which at least can be compressed within given limits. A respective small movement actuation step or several consecutive movement steps of the hydraulic consumer H either is controlled by discharging a hydraulic medium dose from the hydraulic consumer or by feeding the hydraulic medium dose into the consumer, with the hydraulic medium dose being precisely measured solely by using the inherent compressibility of the hydraulic medium.

The hydraulic control device S e.g. comprises a pump P as a pressure source (or a pressure accumulator, not shown), which source feeds hydraulic medium into a line 1. The line 1 either is a supply line or a discharge line or a bypass line to which the hydraulic consumer H is connected. A dosing device D is included in the hydraulic control device S. The dosing device D consists of a first blocking member G1 and a second blocking member G2 which is arranged downstream of the first blocking member G1, and of a dead space T provided in-between. Each blocking member G1, G2 can be switched between a leakage-free blocking position (as shown) and a through flow position, either manually, or as shown, by means of a solenoid 2, 3. In the shown embodiment both blocking members G1, G2 are designed as solenoid multi-way directional seat valves V1, V2 which normally are held by a spring 5 in the blocking position and which are switched by means of the solenoid 2, 3 into the respective through flow position. Alternatively, the solenoid multi-way directional seat valves V1, V2 may be held in the respective through flow position by the springs 5, and then may switch into the blocking position by the solenoid 2, 3. A superimposed control unit CU generates individual switching commands i1, i2 for the solenoids 2, 3. In the dosing device D a line 1' extends e.g. between the blocking members G1, G2. The line 1' contains a dead space T. The dead space T e.g. is an inflexible container 6 which is designed hermetically tight and with a certain internal size. Alternatively (indicated in dotted lines) the volume capacity of the container 6 used for the dosing function, could be varied by manually or hydraulically (indicated with reference number 7) displacing a boundary wall 6, but only prior to or after a dosing step. The dead space T at least partially could be provided within the rigid line 1', or could, not shown, be provided at least partially in the blocking members G1, G2 themselves. As an option, downstream of the second blocking member G2 a biasing valve 4 may be provided upstream of a return system or tank R, in order to e.g. permanently maintain a higher pressure upstream than downstream.

The dosing device D and the function of the dosing device D for one dosing step could be explained in other words as follows: A hydraulic circuit filled with hydraulic medium without entrapped air is under a basic pressure also acting in the dead space T (hermetically tight and with rigid boundary walls) provided in-between the first and second blocking members G1, G2 each apt to be switched between a through flow position and a leakage-free blocking position. The limited compressibility of the only theoretically incompressible hydraulic medium then is used to store a precisely measured dose of hydraulic medium in the dead space by increasing the pressure. In a low pressure condition of the dead space T, with the downstream side blocking member G2 closed, the upstream side blocking member G1 is brought from the blocking position into the through flow position. Then due to the higher pressure upstream the additional dose of the hydraulic medium is stored in the dead space T. When the hydraulic consumer is connected upstream of the first blocking member G1, the dose is taken from the hydraulic consumer which then will move over a minimum adjustment step. If the hydraulic consumer H is connected downstream of the second blocking member G2, and has lower pressure than the dead space T, the dose of hydraulic medium from the dead space T expands into the hydraulic consumer H when switching the second blocking member G2 from the blocked position into the through flow position while the first blocking member G1 is maintained in the blocking position. Then the hydraulic consumer H will carry out a minimum adjustment step. In both cases, the compressibility of the hydraulic medium is used to store the dose of hydraulic medium by alternatingly changing the pressure condition in the dead space.

In order to control a small adjustment movement step of the hydraulic consumer H a pressure difference Δp is built up across the dosing device D from upstream to downstream. Both blocking members G1, G2 e.g. are in blocking position. The pressure between both blocking members G1, G2 is lower than the pressure upstream. The hydraulic medium used, e.g. hydraulic oil, has a compressibility of about 0.7% (e.g. volume percent). The first blocking member G is now switched into the through flow position while the second blocking member G2 is maintained in the blocking position. An additional dose of hydraulic medium enters the already filled dead space. Now the first blocking member G is switched into the blocking position. The hydraulic medium remains compressed in the dead space T. The second blocking member G2 then is switched into the through flow position such that the compressed hydraulic medium in the dead space 6 expands through the second blocking member G2 because of lower pressure downstream and such that a dose of the hydraulic medium flows through the second blocking member G2. In the case that the hydraulic consumer H is connected upstream of the dosing device D, the hydraulic consumer H will carry out a small adjustment step when switching the first blocking member G1 into the through flow position. The magnitude of the small step depends on the measured dose of hydraulic medium flowing into the dead space T by compressing hydraulic medium already contained in the dead space T. In the case that the hydraulic consumer H is connected downstream of the second blocking member G2, the hydraulic consumer H will carry out a small adjustment step when the second blocking member G2 is switched into the through flow position to let the dose flow through. The hydraulic consumer H may be actuated in one direction counter to a load, or may be actuated alternatingly in both directions. Upstream of the hydraulic consumer H shown on the left side, or downstream of the hydraulic consumer H shown on the right side, further, not shown hydraulic components may be provided such that the respective hydraulic consumer H only responds by a small step movement to the displaced hydraulic medium dose.

Starting from a condition in which both blocking members G1, G2 are in the same positions (either in the through flow positions or the blocking positions), for measuring a hydraulic medium dose during one dosing step both blocking members G1, G2 are alternatingly switched over three times. The switchover action may be carried out separately or even in overlapping fashion. The amount of the hydraulic medium dose is determined by the pressure difference Δp across the dosing device, by the volume or capacity of the dead space T, by the duration of the switching actions of the blocking members G1, G2, and, optionally, also by the viscosity of the hydraulic medium, for a given compressibility of the hydraulic medium.

Figure 2:
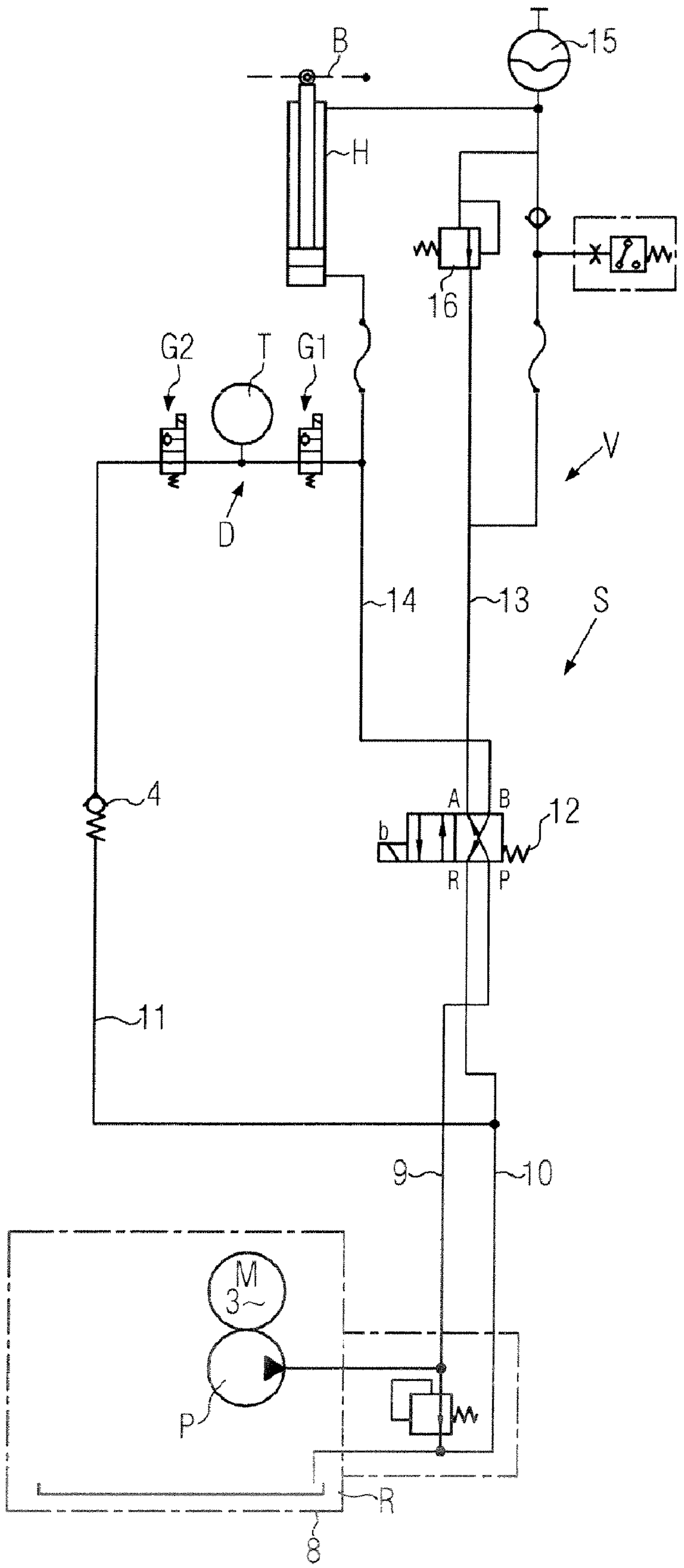
FIG. 2 a block diagram of a hydraulic control device for controlling a solar panel to track the changing position of the sun.

FIG. 2 shows the dosing device D integrated into a hydraulic control device S e.g. belonging to a device V for moving a solar panel by tilting to track the position of the sun in steps. The hydraulic control device S is connected to a motor pump aggregate 8 containing an electric motor M and as a pressure source a pump P as well as a reservoir or a return system R. A connection line 9 extends from the pump P to a solenoid multi-way directional valve 12 from which a return line 10 extends to the return system R. The hydraulic consumer H e.g. is a double actuated differential cylinder to the working chambers of which two working lines 13, 14 extend from the solenoid multi-way directional valve 12. In the working line 13, safeguarded by a pressure limiting valve 16 and a check valve, a pressure accumulator 15 is arranged close to the hydraulic consumer H. The working line 14 extends directly to the solenoid multi-way directional valve 12. A bypass line 11 branches off from the working line 14 and deviates the solenoid multi-way directional valve 12 to the return line 10. The dosing device D having the first and second blocking members G1, G2 and the dead space T is contained in the bypass line 11 in this embodiment. Optionally, also the biasing valve 4 is provided downstream of the second blocking member G2. The hydraulic consumer H is used e.g. to tilt a solar panel B in steps such that the solar panel is tracking the sun. Depending on the switching position of the solenoid multi-way directional valve 12 the hydraulic consumer H generally may be extended or retracted arbitrarily a long way and rapidly, without using the dosing device D. However, to the contrary, the dosing device D serves to retract the differential cylinder in extremely small adjustment steps.

In the evening or prior to sunrise the hydraulic consumer H is actuated accordingly by using the pump P to adjust the solar panel B into a sunrise position, and to load the pressure accumulator 15, if necessary. Then the pump P is switched off with the working line 14 remaining under high pressure. Both blocking members G1, G2 are in their blocking positions. The dead space T has low pressure In adaptation to the position of the sun and after predetermined time intervals measuring steps are carried out by in the dosing device D. During each measuring step a respectively precisely measured hydraulic medium dose is relieved from the hydraulic consumer piston side chamber via the bypass line 11 into the return system R such that the hydraulic consumer H is retracted in small adjustment steps either under the load of the solar panel B and/or in the pressure accumulator 15 and is moving the solar panel B tracking the changing position of the sun.

Figure 3:
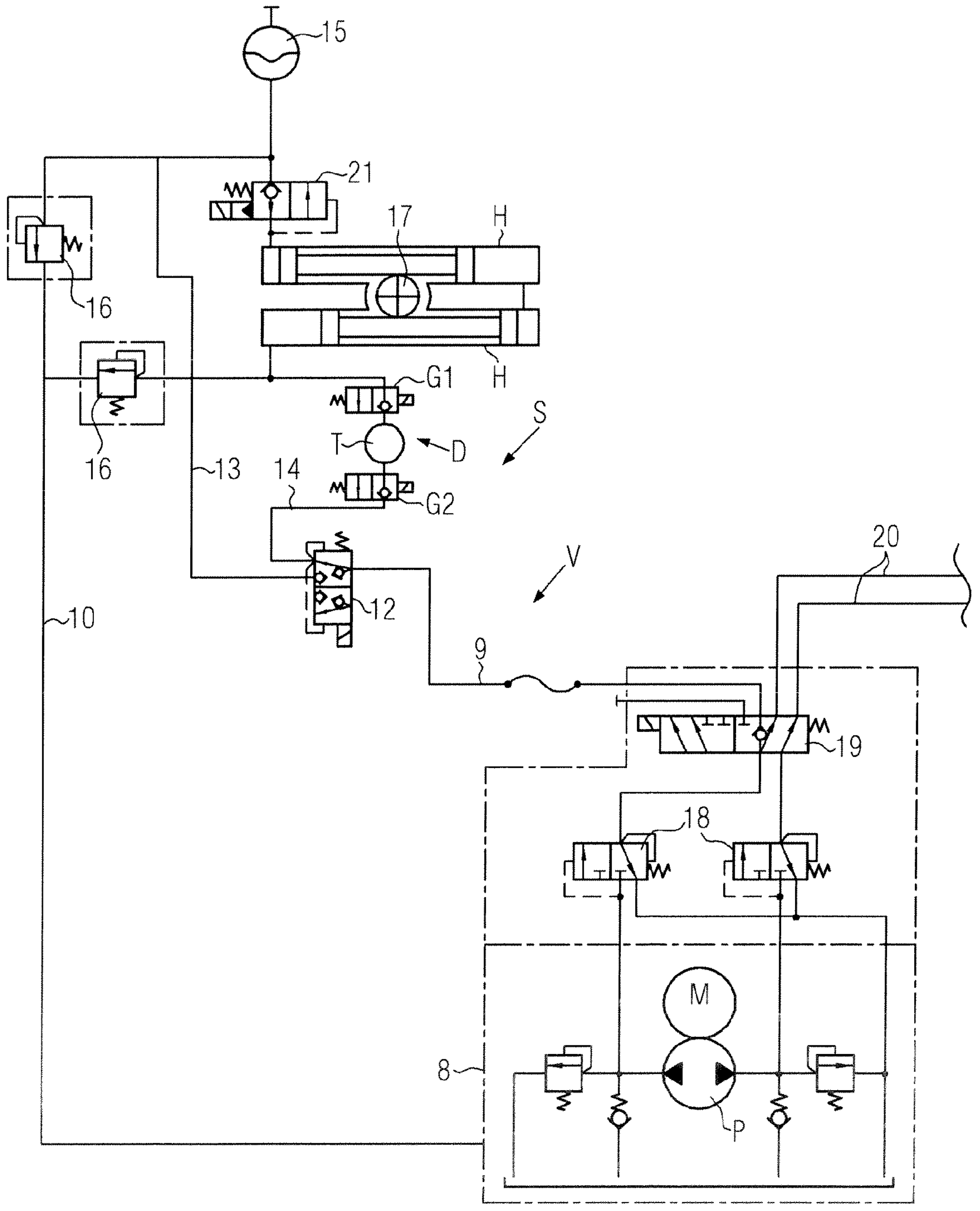
FIG. 3 another embodiment of a hydraulic control device for controlling a solar panel to track the changing position of the sun.

The hydraulic control device S in FIG. 3 is integrated with the dosing device D into a device V for rotating a carrier column 17 of the solar panel B to track the varying position of the sun. The motor pump aggregate 8 contains in addition to the reversible pump P two valves 18 which switch depending on pressure conditions, and a solenoid actuated multi-way directional valve 19. Two connection lines 20 extend from the multi-way directional valve 19 to a not shown tilt adjustment device of the solar panel B (as in FIG. 2), and a single connection line 9 extends to the rotary column adjustment device of the solar panel. The connection line 9 is branched at a solenoid multi-way directional seat valve 12 into two working lines 13, 14 to both actuation sides of two double actuated hydraulic consumers H (hydraulic cylinders) used for rotating the carrier column 17. The pressure accumulator 15 is connected to the working line 13. A solenoid multi-way directional seat valve 21 is located in the working 13 between the pressure accumulator 15 and the hydraulic consumers H. Furthermore, both working lines 13, 14 are connected via pressure limiting valves 16 to the return line 10. The dosing device D is contained in the working line 14.

In the evening or prior to sunrise the column 17 is rotated with the pump switched on by the hydraulic consumers H into the rotary sunrise position. Thereafter the pump P is switched off. The connection line 9 is relieved via the solenoid multi-way directional valve 19 and the valve 18 on the left side to the return system R. The solenoid multi-way directional seat valve 12 is switched into the shown position in which the working line 13 and the loaded pressure accumulator 15 as well as the working line 14 between the hydraulic consumers H and the dosing device D are pressurised. The dead space T has low pressure. After sunrise the dosing device D, as mentioned already, is actuated in predetermined intervals by alternatingly switching the first and second blocking members G1, G2 in order to control both hydraulic consumers under the pressure in working line 13 and the pressure accumulator 15 without the pump P in small steps and in order to rotate column 17 such that the solar panel is tracking the position of the sun.

In this case, as both hydraulic consumers H are switched in series, hydraulic medium discharged from one hydraulic consumer H is supplied to an actuation chamber of the other hydraulic consumer H, when hydraulic medium is discharged in a measured dose into the dosing device D, which is connected via valve 12 and connection line 9 to the return system R.

Figure 4:
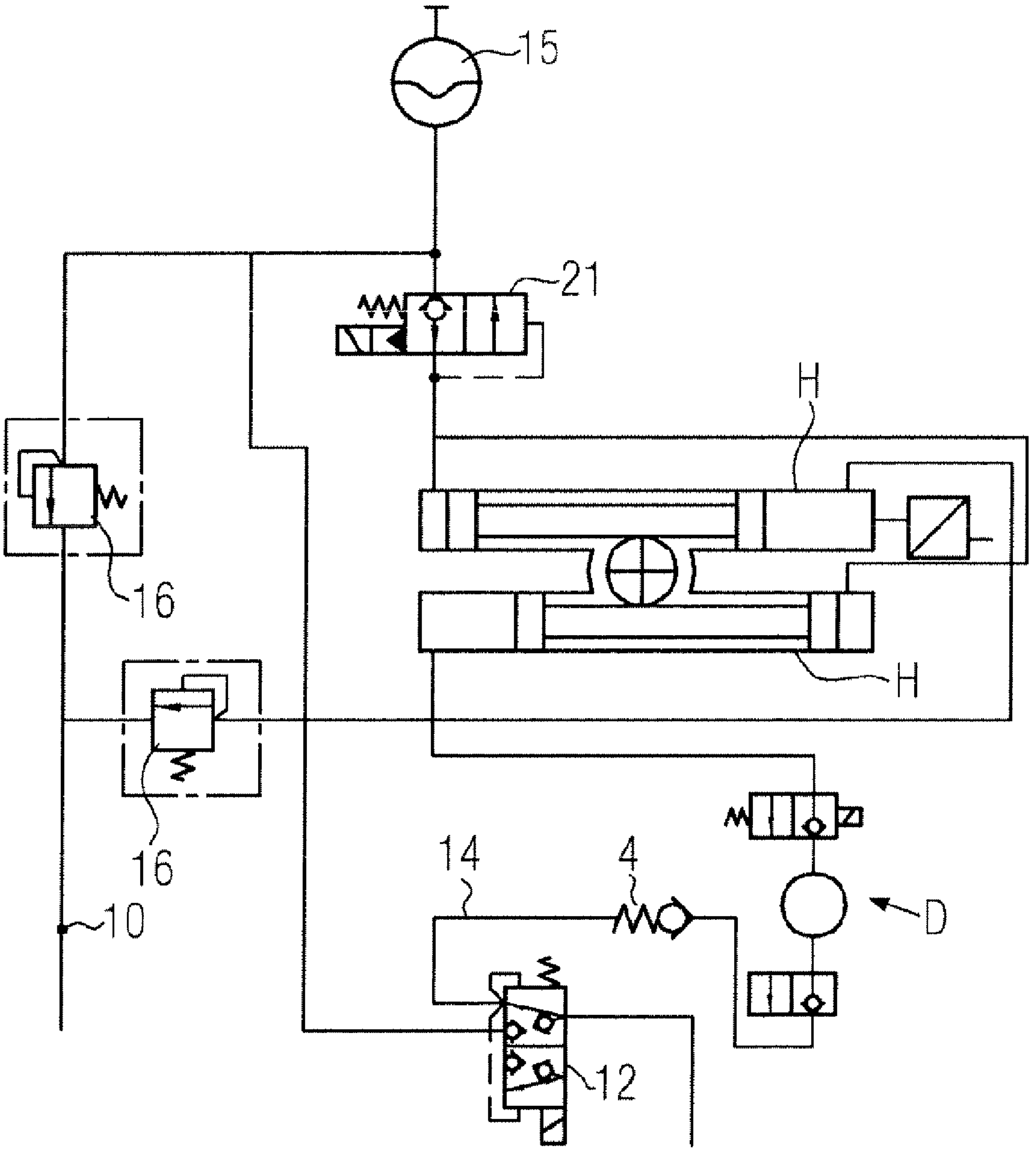
FIG. 4 a detail variant associated to FIG. 3.

In the detail variant shown in FIG. 4 both hydraulic consumers H are switched such that actuation chambers of two hydraulic consumers H are connected in parallel to a respective working line 13, 14. The dosing device D here is contained in the working line 14.

Figure 5:
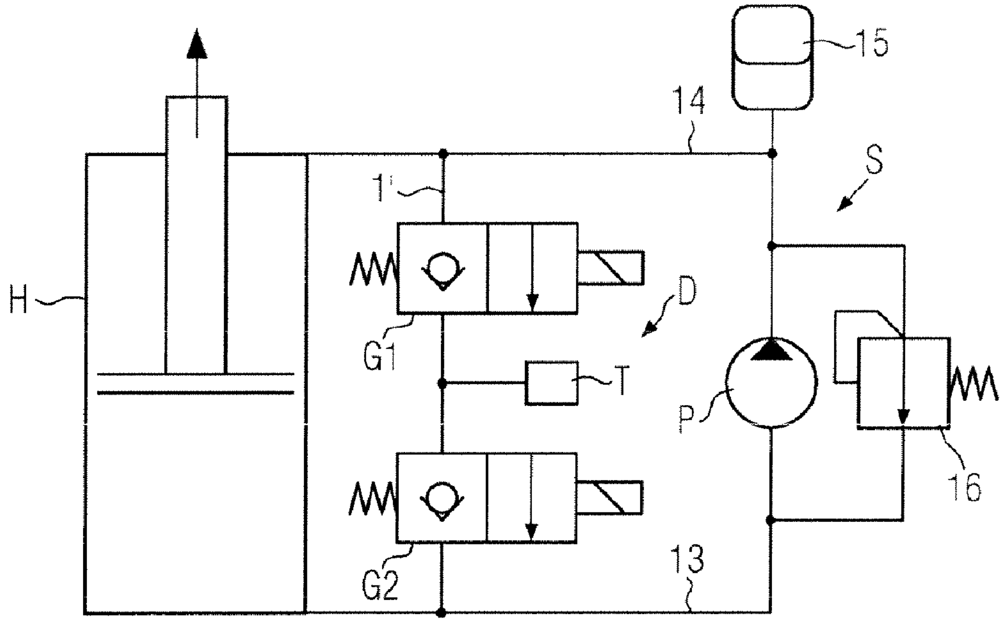
FIG. 5 a block diagram of a further variant of a hydraulic control device.

FIG. 5 shows a hydraulic control device S for moving a retracted hydraulic consumer H in small adjustment steps, e.g. in extending direction (arrow) counter to a load. The hydraulic consumer H is a differential hydraulic cylinder the actuation chambers of which are connected to a respective one of the working lines 13, 14. The working line circuit contains the pump P and a pressure limiting valve 16. The pressure accumulator 15 is connected to the working line 14. The bypass line 1' interconnects both working lines 13, 14 and contains the dosing device D. In this case, the working line circuit is a closed circuit. First the hydraulic consumer H or the differential hydraulic cylinder is retracted by means of the pump P. Then the pump P is switched off. By respectively actuating the dosing device D the hydraulic differential cylinder is extended in small steps without using the pump P.

Figure 6:
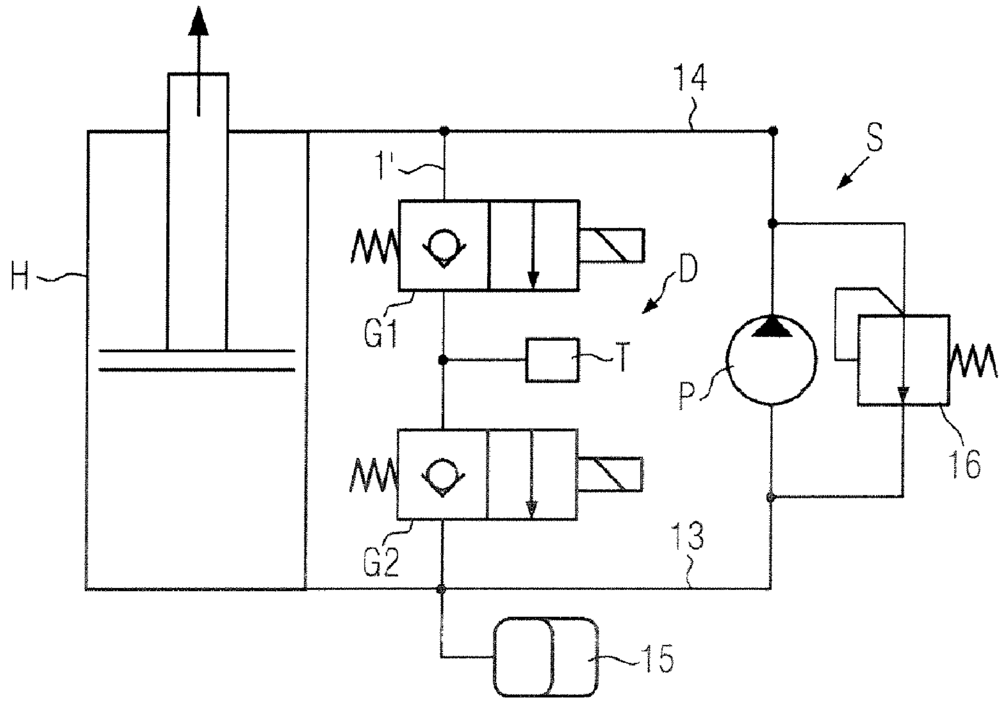
FIG. 6 a block diagram of a further embodiment of a hydraulic control device.

In the embodiment in FIG. 6, which widely corresponds with the embodiment of FIG. 5, the pressure accumulator 15 is connected to the working line 13. Also in this case, the differential hydraulic cylinder is extended in small adjustment steps from a fully retracted position by actuating the dosing device D in steps without using the pump P.

Figure 7:
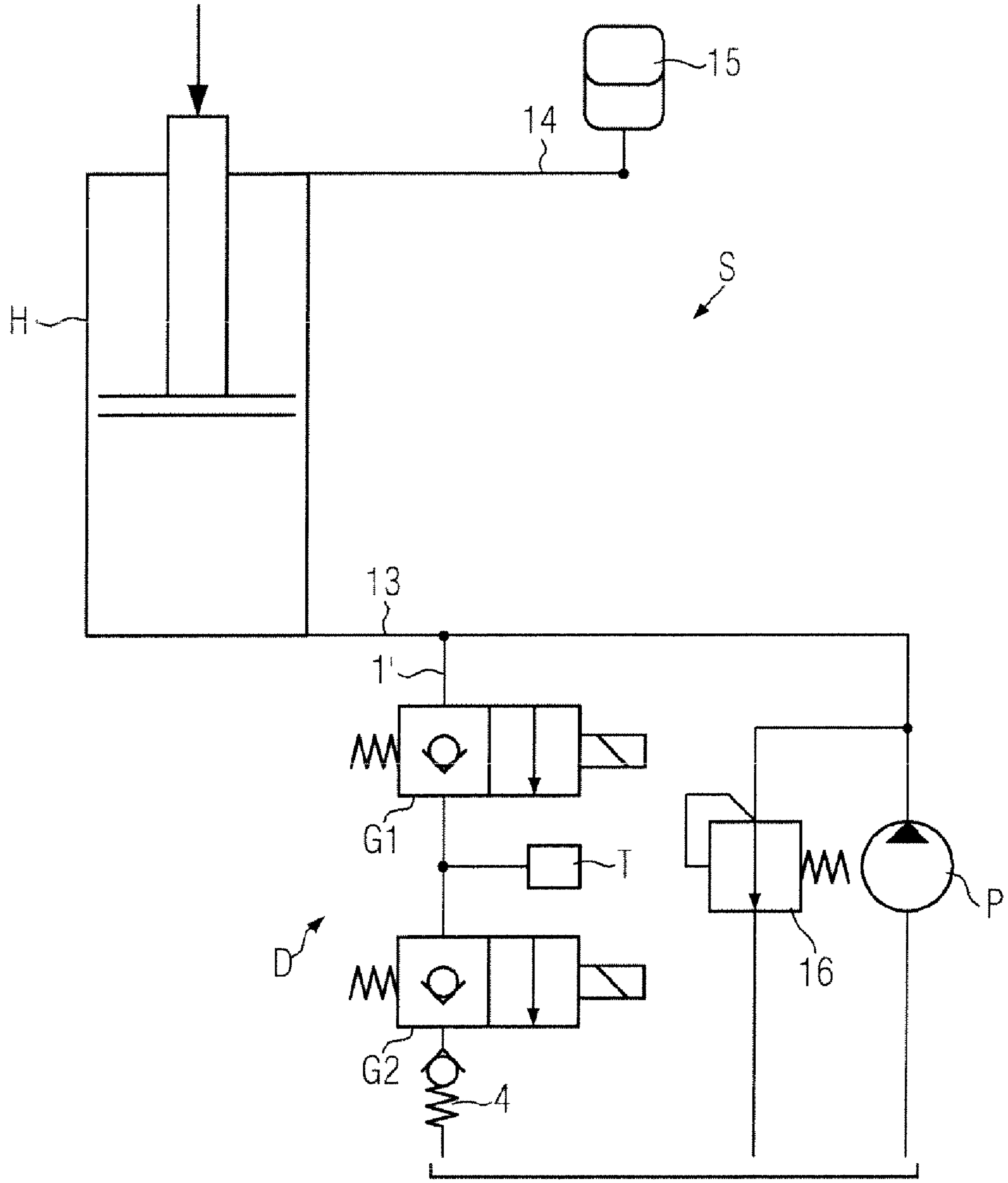
FIG. 7 a block diagram of a further embodiment of a hydraulic control device.

FIG. 7 shows a hydraulic control device S for a hydraulic differential cylinder as the hydraulic consumer H which can be actuated in one direction counter to load. The pressure accumulator 15 is connected via the working line 14 to the chamber at the piston rod side. The working line 13 extends from the pump P to the chamber at the piston side. The dosing device D is arranged between the working line 13 and the return system R. The dosing device D is actuated when carrying out dosing steps, while the pump P is switched off, to move the differential hydraulic cylinder in small steps.

The dosing device D may as well be used in tooling machines or in other machines for controlling extremely small adjustment steps of the hydraulic consumers, e.g. in a tooling machine feed system, without using the pump P.

The invention claimed is:

1. In a hydraulic control device (S) for moving either a solar panel (B) to track the varying position of the sun or for a tooling machine feed system, by controlling at least one hydraulic consumer (H) by pressurised hydraulic medium, the hydraulic control device being of the type having at least one pressure source (P), the hydraulic medium being supplied under pressure from the pressure source (P) into a working line (1, 14, 13) to the hydraulic consumer (H) or under pressure from the hydraulic consumer (H) into a return line or a bypass line (1', 11) to a return system, the improvement being characterised in that a dosing device (D) is contained in at least one of the working line (1, 13, 14), a discharge line, and the bypass line (1', 11), that the dosing device (D) comprises first and second blocking members (G1, G2) arranged in a series from upstream to downstream, and a dead space (T) having a determined hydraulic medium volume capacity in between the first and second blocking members (G1), that the dead space (T) is constituted by a hermetically tight inflexible container (6) and a section of a line (1') extending between the blocking members (G1, G2) and/or partially in at least one of the blocking members (G1, G2), that each blocking member (G1, G2) is a seat valve (V1, V2) movable between a leakage-free blocking position and a through flow position, that in the dosing device (D) a respective hydraulic medium dose is measured by supplying hydraulic medium under high pressure upstream and expanding highly pressurised hydraulic medium to lower pressure downstream exclusively by using a given limited compressibility of the hydraulic medium by alternatingly switching the first and second blocking members (G1, G2), and that for controlling just a small adjustment step of the hydraulic consumer (H) the measured hydraulic medium dose either is supplied to the hydraulic consumer (H) by switching the second blocking member (G1) into the through flow position while the first blocking member (G) is maintained in the blocking position, or by taking the hydraulic medium dose from the hydraulic consumer (H) by switching the first blocking member (G1) into the through flow position while the second blocking member (G) is switched into the blocking position.

2. Hydraulic control device according to claim 1, characterised in that the seat valves (V1, V2) are actuated manually, hydraulically or by solenoids.

3. Hydraulic control device according to claim 1, characterised in that the hydraulic consumer (H) is a hydraulic cylinder for actuation in one direction counter to a load or for a double actuation, to rotate or tilt a solar panel (B), that a dosing device (D) is provided in only one working line (13, 14) or in both working lines of the hydraulic cylinder, and that the hydraulic cylinder is a differential cylinder.

4. Hydraulic control device according to claim 1, characterised in that a biasing valve (4) is provided downstream of the second blocking member (G2).

5. Hydraulic control device according to claim 1, characterised in that at least one pressure accumulator (15) associated to the hydraulic consumer (H) is connected to the working line (13, 14), that the pressure accumulator (15) is supplied with pressure from one of the pressure source (P) and the hydraulic consumer (H), and that the dosing device (D) is arranged in another working line (13, 14) which selectively is connected via a multi-way directional valve (19, 12) with one of the pressure source (P) and the return system (R).

6. A method for controlling movements of at least one hydraulic consumer (H) by a hydraulic medium in a hydraulic control device (S) of a system (V) for adjusting a solar panel (B) such that it is tracking the varying position of the sun, or of a tooling machine feed system, the hydraulic control device (S) comprising at least a pressure source (P), characterised in that for controlling a minimum movement step of the hydraulic consumer (H) a hydraulic medium dose is measured in a dosing device (D) formed by first and second blocking members (G1, G2) arranged in series from upstream to downstream and a dead space (T) of given volume capacity in between the first and second blocking members (G1, G2)

exclusively by using a given limited compressibility of the hydraulic medium, each blocking member (G1, G2) being switched into one of a leakage-free blocking position and a through flow position, that the hydraulic medium dose is measured by alternatingly switching the blocking members (G1, G2) for several times, and that the hydraulic medium dose either is discharged from the hydraulic consumer (H) into the dosing device (D) or is supplied from the dosing device (D) into the hydraulic consumer.

7. The method according to claim 6, characterised in that the pressure source comprises a pump (P) which is selectively switched on and selectively switched off, and that the pump (P) is switched off or maintained switched off, while a respective measured hydraulic medium dose is supplied into or is discharged from the hydraulic consumer (H).

* * * * *